US012769488B2

(12) United States Patent
Park et al.

(10) Patent No.: US 12,769,488 B2
(45) Date of Patent: Oct. 20, 2026

(54) SHARING SERVICE ASSOCIATED WITH IMAGE FORMING APPARATUS

(71) Applicant: Hewlett-Packard Development Company, L.P., Spring, TX (US)

(72) Inventors: Seonae Park, Seongnam Si (KR); Muhy Yoon, Seongnam Si (KR); Junghyeon Yoon, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 300 days.

(21) Appl. No.: 18/684,754

(22) PCT Filed: Jan. 27, 2022

(86) PCT No.: PCT/US2022/013981
§ 371 (c)(1),
(2) Date: Feb. 19, 2024

(87) PCT Pub. No.: WO2023/022752
PCT Pub. Date: Feb. 23, 2023

(65) Prior Publication Data

US 2024/0427529 A1 Dec. 26, 2024

(30) Foreign Application Priority Data

Aug. 20, 2021 (KR) ........................ 10-2021-0110348

(51) Int. Cl.
*G06F 3/12* (2006.01)

(52) U.S. Cl.
CPC .......... *G06F 3/1203* (2013.01); *G06F 3/1236* (2013.01); *G06F 3/1238* (2013.01); *G06F 3/1288* (2013.01); *G06F 3/1292* (2013.01)

(58) Field of Classification Search
CPC .... G06F 3/1203; G06F 3/1236; G06F 3/1238; G06F 3/1288; G06F 3/1292
USPC ........................................................ 358/1.15
See application file for complete search history.

(56) References Cited

U.S. PATENT DOCUMENTS

2004/0196491 A1 10/2004 Uchino
2011/0090529 A1 4/2011 Hertling
2012/0212768 A1 8/2012 Evanitsky
2015/0301774 A1* 10/2015 Utsumi .............. H04N 1/00307 358/1.15
2016/0112585 A1* 4/2016 Park ...................... G06F 3/1206 358/1.15

* cited by examiner

*Primary Examiner* — Jamares Q Washington
(74) *Attorney, Agent, or Firm* — Foley & Lardner LLP

(57) ABSTRACT

An example method performed at a client device includes establishing a connection with a server to provide users with services being associated with image forming devices, by using first user registration information of a first user, receiving from the server first service information about a first service associated with a first image forming device registered for the first user, displaying the first service information through a user interface device of the client device to receive user identification information about a second user through the user interface device, and transmitting to the server the received user identification information about the second user such that the server provides the second user with the first service associated with the first image forming device.

14 Claims, 9 Drawing Sheets

SHARING SERVICE ASSOCIATED WITH IMAGE FORMING APPARATUS

BACKGROUND

An image forming apparatus may perform an image forming operation such as printing, copying, scanning, faxing, storage, transmission, and coating. As the image forming operation is performed, a consumable in the image forming apparatus may be consumed. The consumable may be replaced periodically according to the workload of the image forming operation. Accordingly, the image forming apparatus may need to provide a maintenance service and a service for increasing user convenience.

BRIEF DESCRIPTION OF THE DRAWINGS

Various examples will be described below by referring to the following figures.

DETAILED DESCRIPTION

Figure 1:
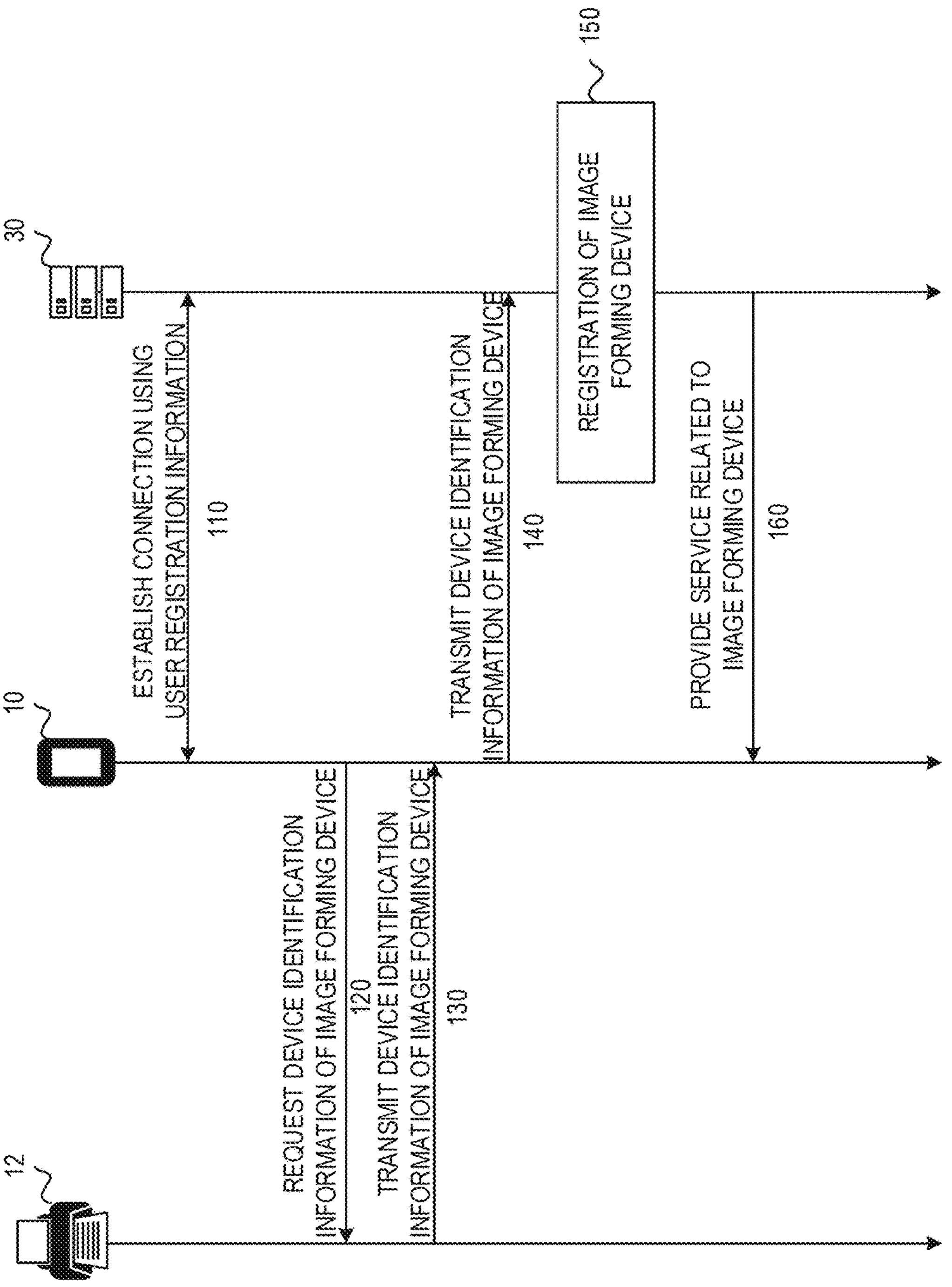
FIG. 1 is a flowchart illustrating a process of registering an image forming device for a user in a server according to an example.

An image forming device (i.e., an image forming apparatus) may be used by a plurality of users. For example, each user may use the image forming device by connecting their client device to the same network to which the image forming device is connected. In addition to the image forming device, other devices may be connected to the network. In that case, there may be a security concern, such as the security may be breached, if opening the network to a plurality of users. Therefore, various described examples allow a plurality of users to use an image forming device while maintaining security.

In an example, a plurality of users may use an image forming device while maintaining security. For example, a first user may share a first service with a second user, the first service being associated with a first image forming device registered for the first user. The second user may use the first image forming device through the first service. The first user may select at least one of a plurality of image forming devices registered for the first user to share with the second user. The first user may select at least one of a plurality of services associated with an image forming device to share with the second user. The first and second users are independent of each other, and may register their image forming devices, subscribe to services associated with their image forming devices, and share the services with each other.

Hereinafter, examples will be described with reference to the accompanying drawings. However, the present disclosure may be implemented in various different forms and is not limited to the examples described herein.

Terms including ordinals such as first, second, etc. may be used to identify various components, but the components are not limited by the terms. These terms are used for the purpose of distinguishing one component from another. For example, a first component may be referred to as a second component, a second component may be referred to as a first component, and their ordinal number may be omitted.

A “client device” may refer to a device that receives a user’s command and displays information processed according to the user’s command. The client device may be, for example, an image forming device, a Personal Computer (PC), a tablet PC, a Personal Digital Assistant (PDA), a laptop, a smartphone, a mobile phone, or the like. In the client device, programs related to an operation of the client device or an external apparatus may be installed. The client device may communicate information with an image forming device or a server through a program installed in the client device. The client device may transmit to the server information received from the image forming device, and transmit to the image forming device information received from the server. For example, a program related to an example operation described below may be installed on the client device.

An “image forming device” may refer to any kind of device capable of performing an image forming operation, such as a printer, a copier, a scanner, a fax machine, a multi-function printer (MFP), a display device, etc. The image forming device may be a two dimensional (2D) image forming device or a 3D image forming device. An “image forming operation performed by the image forming device” may refer to an operation related to printing, copying, scanning, faxing, storage, transmission, coating, etc., or a combination of two or more of the operations described above.

A “server” may refer to a device that provides a user with a service associated with an image forming device. The server may refer to a provider that provides a user with a service associated with an image forming device. The server may include of a plurality of servers, and the plurality of servers may be distinguished from each other according to functions performed by each server. For example, the server may include a portal server to interact with a user, a cloud platform server to provide a user with a service, and a cloud service server to provide various application programming interfaces (APIs) for registering a user (e.g., generating a user account), registering an image forming device for a user, associating a service with a user or an image forming device, disassociating a service from a user or an image forming device, etc. The portal server, cloud service server, and cloud platform server may communicate with each other. In an example, a user may request a service through the portal server and be provided with the service through the cloud platform server. The portal server, cloud service server, and cloud platform server may be expressed as one server for convenience of description, but may be implemented by more than one server. The server may create, search, change, delete, or store information or data related to a service which is provided to a user, a client device, an image forming device, etc.

A "service" may refer to an operation or a series of operations to be performed by a server for a user, a client device of the user, or an image forming device of the user. The service may be a subscription service, and may be associated with a user or an image forming device. For example, based on a user subscribing to a certain service, the subscribed service may be associated with the user. For example, a user may purchase an image forming device and subscribe to a service applied to the image forming device. the subscribed service may be associated with the user or the image forming device. A service may be associated with a user and an image forming device. The service may be extended to another user or another image forming device. For example, a user may share a service to which the user subscribes with another user, and the service may be associated with the shared user or an image forming device of the shared user. For example, a user may register a new image forming device, and a service to which the user subscribes or a shared service may be associated with the newly registered image forming device.

The service may include any of various services associated with an image forming device, such as, a printing service, a character recognition service, a paper delivery service, a toner supply service, an inspection service of an image forming device, a consumable replacement service, etc. The service may be provided to a user using an image forming device of the user. For example, a service of controlling a remotely-located image forming device to perform printing based on a request of the user may be provided to the user. The service may be provided in a client device or an image forming device of a user by their purchase of the image forming device. For example, a service of recognizing characters of a scanned document may be provided to the user.

"Service information" may refer to information about a service associated with an image forming device, and further include information about the image forming device associated with the service. For example, the service information may include a list of information about image forming devices associated with a service, and a list of information about services associated with an image forming device. The service information may include information about an identifier, contents, a providing period, a providing scope, a providing target, a provider, a beneficiary of a service, whether to charge for the service, whether the service is activated, etc. The service information may be stored in a server and referred by the server.

A beneficiary of a service may include an owner or a tenant of the service. The owner of the service refers to a user who subscribes to the service and has authority to allow another user to use the service. The tenant of the service refers to a user who uses the service with permission from the owner of the service. The owner and tenant of the service may be referred to as a sharer and a shared user of the service, respectively. Information about an owner or a tenant of a service may correspond to user registration information or user identification information of the owner or the tenant.

The server may refer to the service information to detect an identifier, contents, a providing period, a providing scope, a providing target, a provider, a beneficiary of a service, whether to charge for the service, whether the service is activated, etc. A client device may display at least a portion of the service information in order for a user to use the service. For example, the client device may display related information through a graphic user interface by referring to the service information. For example, a list of information about image forming devices associated with a service and a list of information about services associated with an image forming device may be displayed through the graphic user interface.

FIG. 1 is a flowchart illustrating a process of registering an image forming device for a user in a server according to an example.

Referring to FIG. 1, a user may request a server 30 to register the user and an image forming device 12 by using a client device 10.

The client device 10 and the image forming device 12 may be implemented as one device. The client device 10 and the image forming device 12 are illustrated as a smartphone and a printer in FIG. 1, but are not limited thereto. The server 30 may include a plurality of servers. The plurality of servers may be distinguished from each other according to functions performed by each server, but may be referred to as the server 30 for convenience of description.

At operation 110, a connection between the client device 10 and the server 30 may be established by using user registration information.

The user registration information refers to user registration information which is registered or stored in the server 30 to identify a user. A user may request a portal provided by the server 30 to register the user by using user identification information. An API to create an account may be called in the server 30 to perform the user registration. After the user registration is completed in the server 30, the user may log in to the portal by using the user registration information to establish a connection between the client device 10 and the server 30. The portal may include various graphic user interfaces to interact with a user. The portal may include graphic user interfaces to provide information about a user or a device, such as information about the image forming device 12 and service information about a service associated with the image forming device 12. Information may be communicated between the client device 10 and the server 30 through the portal.

The user identification information refers to information to identify a user, such as, a user name, an account name, an ID, recipient information to receive a message, etc. The recipient information may include phone-number information to receive a text message, social network service (SNS) account information to receive an SNS message, an email address to receive an email, but is not limited thereto. A user may request the server 30 to register the user by using the user identification information to use a service associated with the image forming device 12, the service being provided by the server 30. The user identification information used to register the user in the server 30 may also be used as user registration information.

The operation 110 is illustrated to be performed before operations 120 and 130 in FIG. 1, but is not limited thereto. The operation 110 may be performed after operations 120 and 130.

At operation 120, the client device 10 may request device identification information of the image forming device 12 from the image forming device 12. The device identification information of the image forming device 12 may be used by the server to identify the image forming device 12, and include information about a model number, a unique device identifier, a media access control (MAC) address, etc.

At operation 130, the image forming device 12 may transmit the requested device identification information to the client device 10.

In an example, operations 120 and 130 may be performed in response to scanning a quick response (QR) code of the image forming device 12 by the client device 10.

At operation 140, the client device 10 may transmit the device identification information of the image forming device 12 to the server 30.

At operation 150, the server 30 may perform registration of the image forming device 12 for the user based on the transmitted device identification information of the image forming device 12. The image forming device 12 registered for the user may maintain a connection with the server 30 through the Internet without going through the client device 10. The image forming device 12 may transmit, periodically or based on occurrence of an event, to the server 30 device status information about a current status of the device 12, such as whether the device 12 is connected to the Internet, whether the device 12 is secured, whether the device 12 is able to perform printing, whether the device 12 has sufficient supplies such as paper, ink, and toner to perform printing, a remaining amount of paper, ink, and toner, etc. The server 30 may represent the current status of the image forming device 12 through the portal based on the received device status information.

At operation 160, the server 30 may provide the client device 10 with a service associated with the image forming device 12. An example process of providing a service associated with the image forming device 12 will be explained by further referring to FIG. 2.

Figure 2:
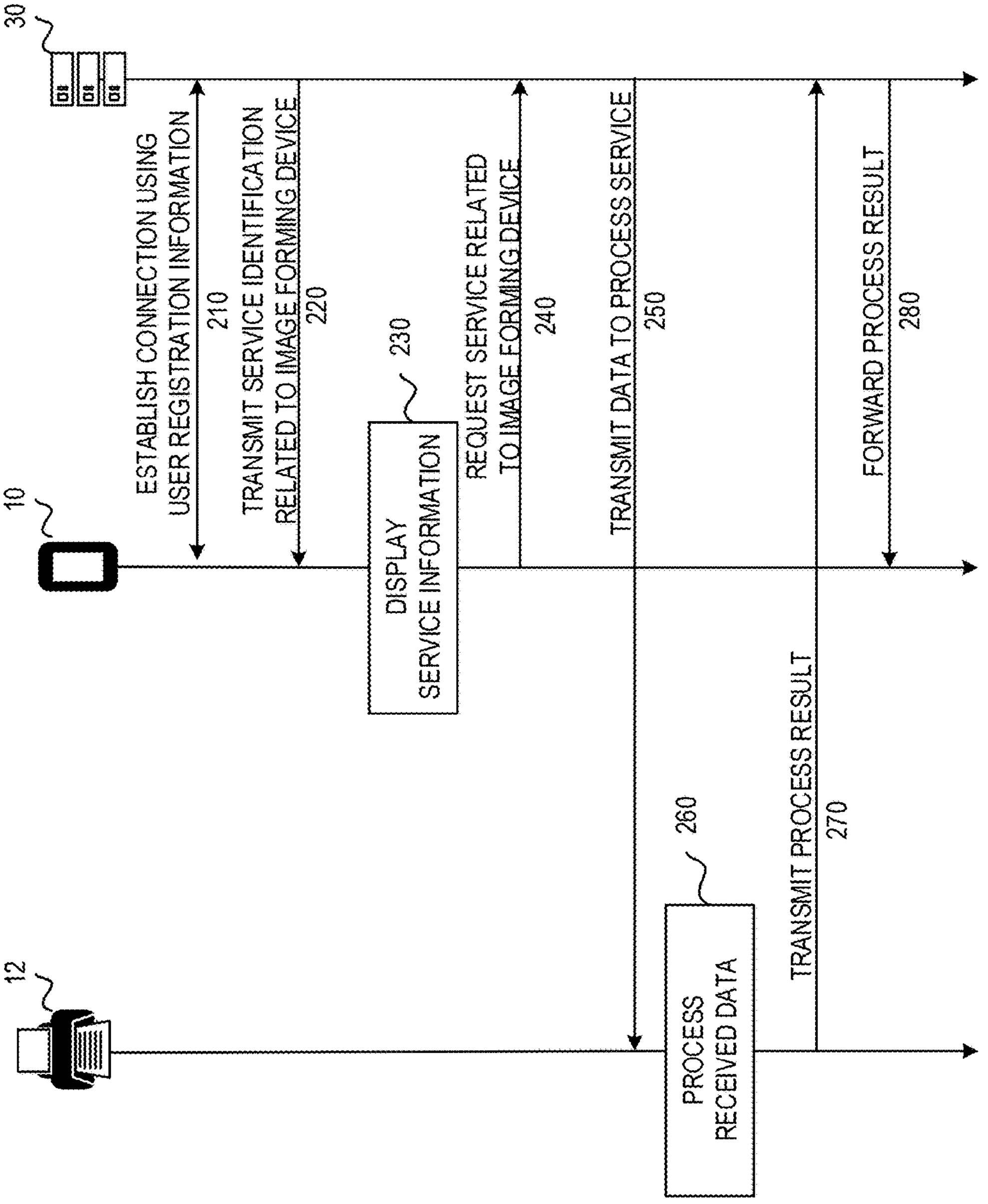
FIG. 2 is a flowchart illustrating a process in which a server provides a service associated with an image forming device according to an example.

FIG. 2 is a flowchart illustrating a process in which a server provides a service associated with an image forming device according to an example.

Referring to FIG. 2, a service associated with an image forming device 12 and provided by the server 30 may refer to a service which is provided to the user by using the image forming device 12, for example, remotely controlling the image forming device 12 to perform printing according to a request of the user. The service associated with the image forming device 12 may include a service available by purchase of the image forming device 12. For example, the service associated with the image forming device 12 may be a service to recognize characters in a document scanned at the client device 10 or the image forming device 12. For example, the service associated with the image forming device 12 may be a service to supply a consumable used in the image forming device 12, such as ink, a toner cartridge, etc.

The service associated with the image forming device 12 may be a subscription service. For example, a certain number of pages may be allowed to print remotely at the image forming device 12 through a service by using the client device 10 such as a smartphone remotely located from the image forming device 12. For example, a certain number of pages may be allowed to be scanned to recognize characters through a service to recognize characters in a scanned document. For example, ink, a toner cartridge, etc. may be supplied to the image forming device 12 of the user periodically or based on a remaining amount of ink, toner cartridge, etc.

At operation 210, the client device 10 may establish a connection between the client device 10 and the server 30 using the user registration information to provide the user with the service. For example, the connection between the client device 10 and the server 30 may be established by the user logging in to the portal provided by the server 30 using the user registration information. The portal may be implemented on the web or an application, and may include various graphic user interfaces to interact with the user. The user may enter their user registration information to the graphic user interface displayed on the client device 10 to log in to the portal.

At operation 220, the server 30 may transmit to the client device 10 service information of a service associated with the image forming device 12. The service information may be mapped to the user registration information, and the server 30 may retrieve the service information based on the user registration information used by the user for connecting to the server 30. Device identification information of the image forming device 12 may be mapped to the user registration information or the service information that is mapped to the user registration information. The service information about a service associated with the image forming device 12, information about the user, information about devices registered for the user such as the image forming device 12 may be displayed through the portal or its graphic user interface.

At operation 230, the client device 10 may display the service information transmitted from the server 30. For example, the client device 10 may display related information through a graphic user interface based on the service information. The service information may be displayed on the portal accessed by the user. The service information may include a list of services associated with image forming devices. The service information may include a list of image forming devices associated with services. Based on the service information transmitted from the server 30 to the client device 10, at least one of whether to charge for the service, whether the service is activated, an identifier, contents, a providing target, a providing period, a providing scope, a provider, an owner, and a tenant of the service associated with the image forming device 12 may be displayed. Information about an owner or tenant of a service may correspond to user registration information or user identification information of the owner or tenant.

At operation 240, the client device 10 may request the service associated with the image forming device 12 from the server 30. For example, a graphic user interface may include a button for the user to request a service associated with the image forming device 12 from the server 30. In response to selecting the button, the service associated with the image forming device 12 may be requested. For example, the service may be a print on-the-go service to allow a user to transmit to the server 30 a request for printing of a document through a client device 10 to print the document at the image forming device 12.

At operation 250, the server 30 may transmit to the image forming device 12 data for processing the service. For example, printing data may be transmitted from the server 30 to the image forming device 12 for processing the print on-the-go service.

At operation 260, the image forming device 12 may process the received data. For example, the image forming device 12 may perform printing based on the printing data transmitted from the server 30.

At operation 270, the image forming device 12 may transmit to the server 30 a result of processing the received data. For example, the image forming device 12 may transmit to the server 30 a message to indicate that a requested print is completed or has failed.

At operation 280, the server 30 may transmit to the client device 10 information corresponding to the result transmitted from the image forming device 12.

The user may request the server 30 to provide a service associated with the image forming device 12 through the client device 10, and the user may be an owner or a tenant of the service.

Figure 3:
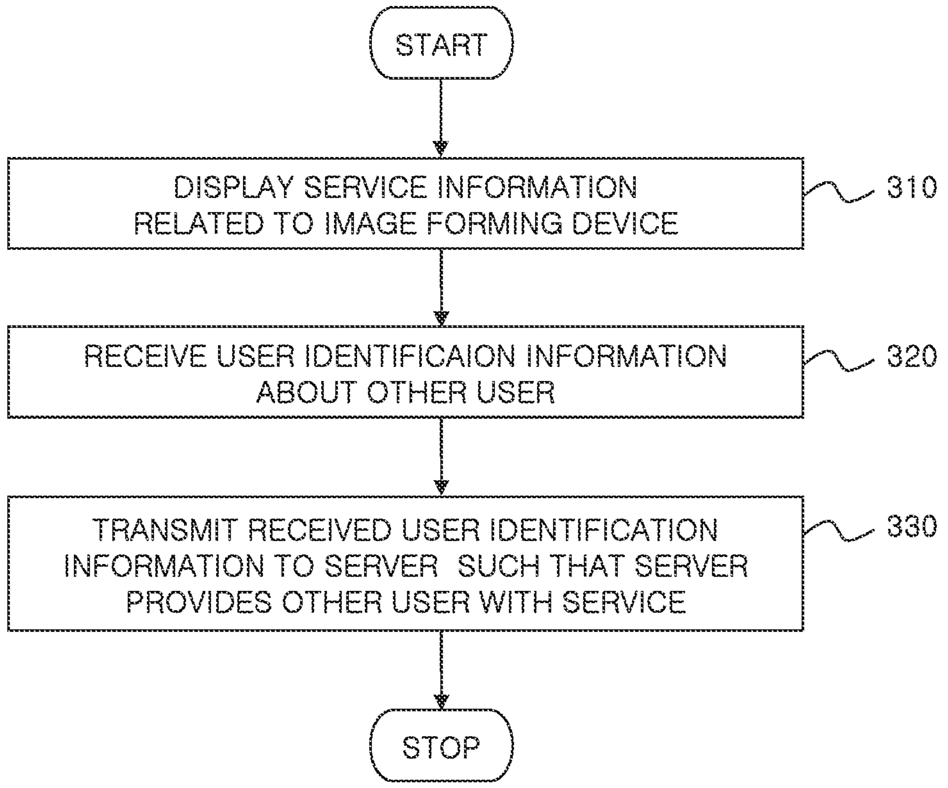
FIG. 3 is a flowchart illustrating a process in which a client device shares a service associated with an image forming device according to an example.

An example process of sharing a service with another user is explained by referring to FIG. 3. A user who shares a service with another user may be referred to as an owner or a sharer of the service. A user who is provided with a shared service may be referred to as a tenant or a shared user of the service. The owner and tenant of the service may be referred to as a first user and a second user, respectively. However, the first user and the second user may be used to distinguish different users in the disclosure depending on the context.

The owner or the sharer of the user may be a subscriber who subscribes to and pays for the service.

FIG. 3 is a flowchart illustrating a process in which a client device shares a service associated with an image forming device according to an example.

Referring to FIG. 3, service information about a service associated with an image forming device may be displayed on a client device at operation 310.

The service information may be displayed after connection between the client device and the server is established. The service information stored in the client device may be displayed, even after the connection between the client device and the server is disconnected. The connection between the client device and the server may be established by using user registration information of a user of the client device. For example, the user of the client device may use their user registration information to log in to a portal provided by the server to establish the connection between the client device and the server.

The service information may be displayed through the portal accessed by the user. The portal may be implemented on the web or an application, and include various graphic user interfaces to interact with a user. Service information may refer to information about a service associated with an image forming device, and further include information about the image forming device associated with the service. Information regarding whether to charge for the service, whether the service is activated, an identifier, contents, a providing target, a providing period, a providing scope, a provider, an owner, and a tenant of the service associated with the image forming device may be displayed through a graphic user interface.

The graphic user interface may include a button for a user to request a server to provide a service associated with the image forming device. The graphic user interface may include a button for a user to share a service which is associated with the image forming device with another user. The button to share a service with another user may be implemented to be toggled, and the other user may be provided with the shared service according to a toggle status of the button. In a case where the button to share a service with another user is selected, a field to enter user identification information about the other user (i.e., a shared user) may be displayed.

The service information may include a list of services associated with image forming devices. A service to be shared with another user may be selected from the service list.

The service information may include a list of image forming devices associated with services. A service associated with an image forming device selected from the device list may be shared with other users.

At operation 320, user identification information about a shared user may be received at the client device. For example, based on a button to share a service with another user that is displayed in the graphic user interface of the portal being selected, a field to enter user identification information about a shared user, and the user identification information may be entered in the field.

A user name, an account name, an ID, recipient information to receive a message, etc. may be used as the user identification information. The recipient information may include phone-number information to receive a text message, SNS account information to receive an SNS message, an email address to receive an email, but is not limited thereto.

At operation 330, the received user identification information may be transmitted from the client device to the server to provide the shared user with the service. The server may provide the service to the user of the client device and to another user, an example of which will be explained by referring to FIG. 4.

Figure 4:
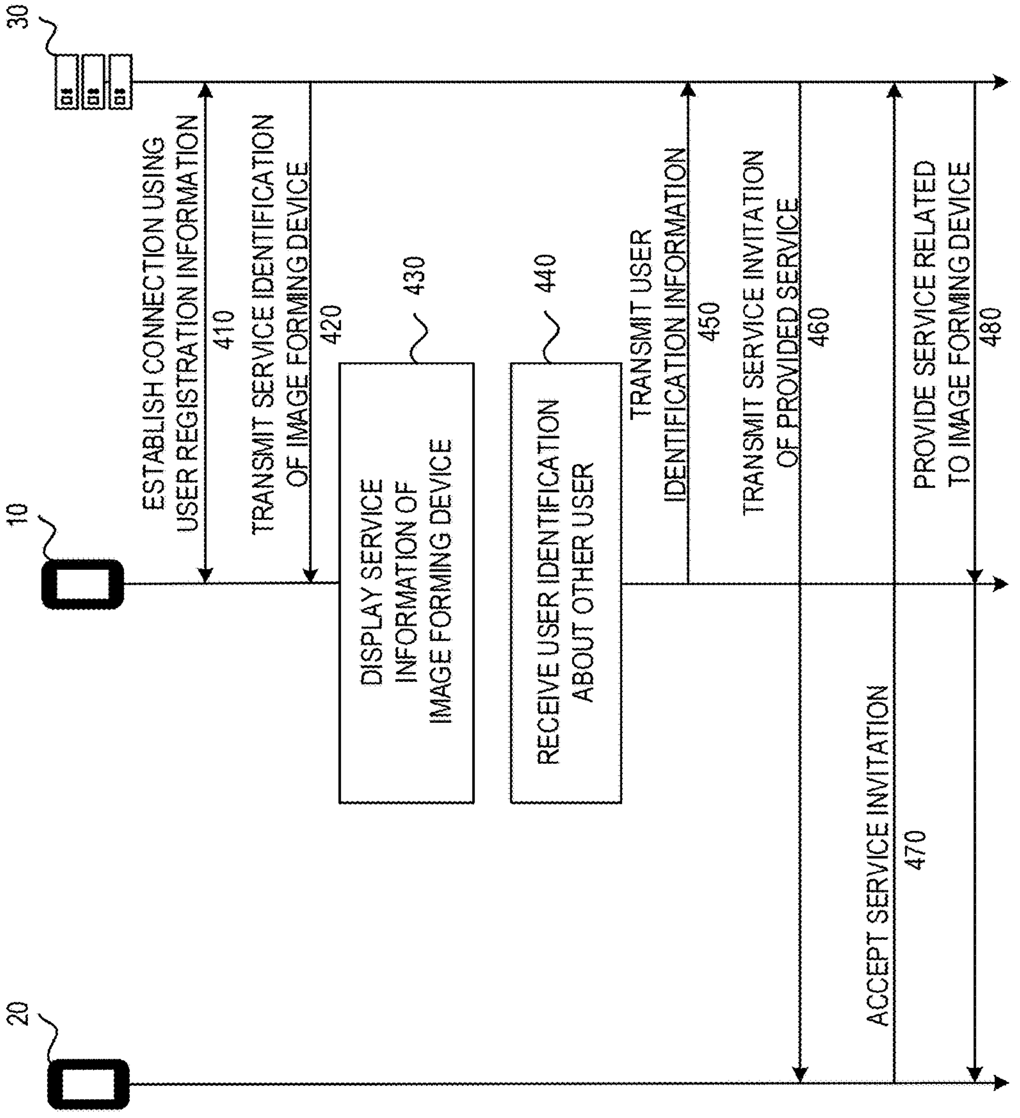
FIG. 4 is a flowchart illustrating a process in which a shared user is provided with a service associated with an image forming device according to an example.

FIG. 4 is a flowchart illustrating a process in which a shared user is provided with a service associated with an image forming device according to an example.

Referring to FIG. 4, a client device 10 of a user may establish a connection with a server 30 using user registration information of the user at operation 410. For example, the user may log in to a portal provided by the server 30 using the client device 10 user registration information to establish the connection between the client device 10 and the server 30.

At operation 420, the server 30 may transmit to client device 10 service information of a service associated with the image forming device. The service information may be mapped to the user registration information of the user, and the server 30 may retrieve the service information mapped to the user registration information to transmit the service information to the client device 10. Device identification information of the image forming device 12 registered for the user may be mapped to the user registration information of the user, and the server 30 may retrieve the device identification information mapped to the user registration information to transmit the device identification information to the client device 10.

The service information may include information about an identifier, contents, a providing period, a providing scope, a providing target, a provider, a beneficiary of a service, whether to charge for the service, whether the service is activated, an image forming device associated with the service, etc.

At operation 430, the client device 10 may display the service information received from the server 30. For example, the client device 10 may display service-related information through a graphic user interface based on the received service information. The graphic user interface may include a button for a user to share a service which is associated with the image forming device with another user. A button to share a service with another user may include a text such as “share”, or “invite” or a corresponding icon. The button to share a service with another user may be implemented to be toggled, and the sharing of the service may be started or stopped according to a toggle status of the button. The service for which the sharing is stopped may be disassociated from the user. Even after the sharing of the service is stopped, user registration information of a formerly-shared user may remain such that the formerly-shared user may be provided with services by the server as an independent user. A user who shared the service may request to delete their user registration information. For example, the user who shared the service may request the portal provided by the server 30 to delete their user account. Even after the user registration information of the user who shared the service is deleted, the user registration information of a formerly-shared user may remain such that the formerly-shared user may communicate with the server 30 as an independent user to register their device or subscribe to a service associated with their device. In a case where a user who shared a service with another user requests deletion of their user registration information or account, the sharing of the service with the other user may be stopped accordingly. A user may be allowed to request their account after the user stops to share the service with others, which may prevent the user from unintentionally stopping sharing of the service. A user may be notified that sharing of the service is stopped, in response to the user requesting deletion of their account, which may prevent the user from unintentionally stopping sharing of the service. Even after a sharer of a service stops sharing of the service and deletes their user registration information, a formerly-shared user may still communicate with the server 30 as an independent user to register their device or subscribe to a service associated with their device, such as, a formerly-shared service.

At operation 440, the client device 10 may receive user identification information about another user, that is, a shared user. For example, the client device 10 may display various options for entering user identification information about a shared user in response to selecting a button to share a service with another user. The various options may include an option to directly enter user identification information about a shared user, an option to select a shared user in an application installed on the client device 10, such as, a contacts application, a messenger application, an SNS application, etc. A user name, an account name, an ID, recipient information of the shared user, etc. may be used as the user identification information of the shared user. The recipient information may include phone-number information to receive a text message, SNS account information to receive an SNS message, an email address to receive an email, but is not limited thereto.

At operation 450, the client device 10 may transmit to the server 30 the received user identification information. An API to share a service may be called in the server 30 in response to receiving the user identification information from the client device 10. In response to the API to share a service being called, the server 30 may perform operation 460. Operation 460 may be performed depending on whether user registration information corresponding to the user identification information exists in the server 30, an example of which will be explained by referring to FIG. 5.

At operation 460, the server 30 may transmit, to a user indicated by the received user identification information, a service invitation to provide the service. The service invitation may be transmitted to a client device 20 of the user in a form of a text message, an SNS message, an email message, etc. The service invitation may include an authorization code and/or user registration information of the sharer. For example, the service invitation may include a uniform resource locator (URL) address or its hyperlink including an authorization code and/or user registration information of a sharer, the addresses may be linked to a user login page provided in the portal of the server 30. The authorization code and/or the user registration information of the sharer may be encrypted to be included in the service invitation.

At operation 470, a shared user may accept the service invitation on their client device 20. For example, in response to selecting a hyperlink included in the service invitation on the client device 20, the user login page of the portal may be displayed on the client device 20, and login or request for user registration of the shared user may be taken as an acceptance of the service invitation. The login or request for user registration of the shared user may be substantially similar to an example process explained in operation 110 in FIG. 1.

At operation 480, the server 30 may provide the client devices 10 and 20 or their users with the service being associated with the image forming device according to requests from the client devices 10 and 20. An example method of providing a service associated with an image forming device 12 in response to a request of a client device 10 in FIG. 2 is substantially the same as a method of providing the service associated with the image forming device 12 in response to a request of a client device 20, and a redundant explanation will be omitted.

A user of the client device 10 may share a service associated with their image forming device with another user. Therefore, the other user may be provided with the service which the user does not directly subscribe to or pay for.

Figure 5:
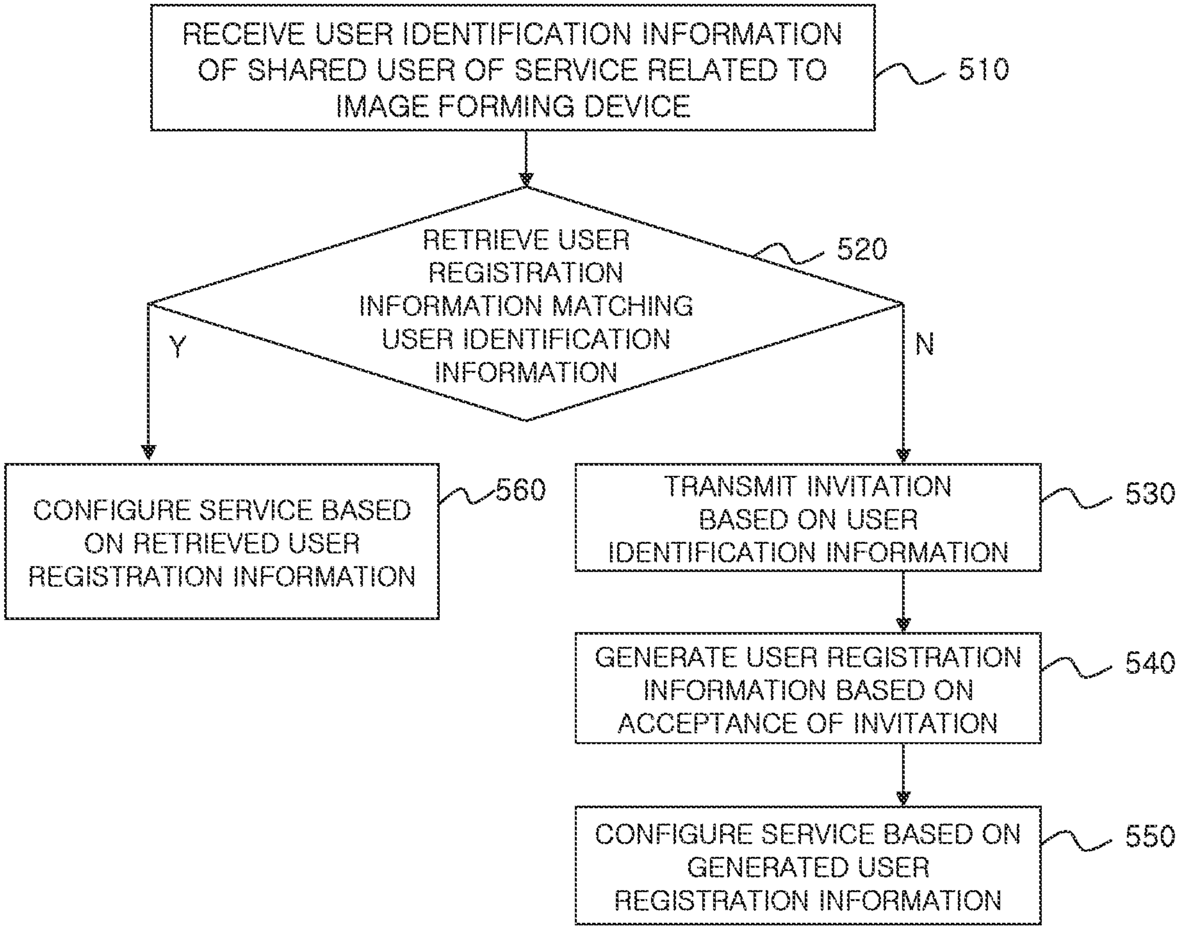
FIG. 5 is a flowchart illustrating a process in which a server provides a shared user with a service associated with an image forming device according to an example.

FIG. 5 is a flowchart illustrating a process in which a server provides a shared user with a service associated with an image forming device according to an example.

Referring to FIG. 5, user identification information of a shared user may be received at a server at operation 510. In response to receiving the user identification information, an API to share a service may be called in the server.

At operation 520, the server may retrieve user registration information matching the received user identification information. For example, the received user identification information may include an email address, and the server may retrieve user registration information corresponding to the email address. At operation 530, the server may transmit a service invitation using the received user identification information in a case where the server fails to retrieve user registration information matching the user identification information. The user identification information may be a phone number, an SNS account, an email address, etc. and the service invitation may be transmitted in a form of a text message, an SNS message, an email message, etc. The service invitation may include an authorization code and/or user registration information of the sharer. For example, the service invitation may include a URL address or its hyperlink including an authorization code and/or user registration information of a sharer, and the addresses may be linked to a user login page provided in the portal of the server The authorization code and/or the user registration information of the sharer may be encrypted to be included in the service invitation.

At operation 540, the shared user may accept the service invitation to request user registration through a user login page of the portal. In that case, the server may generate and store user registration information about the shared user.

At operation 550, the server may allow the shared user to access the shared service based on the generated user registration information. For example, the server may associate the generated user registration information of the shared user with the service. For example, the server may register the user registration information of the shared user with tenant information of service information of the shared service.

At operation 560, in a case where user registration information matching the user identification information exists in the server, that is, the user registration information is retrieved at the server, the server may allow the shared user to access the shared service based on the retrieved user registration information. For example, the server may associate retrieved user registration information of the shared user with the service. An image forming device may be registered for the retrieved user registration information of the shared user. The image forming device that is registered for the user registration information of the shared user may be referred to as a second image forming device. A first image forming device and a second image forming device may indicate an image forming device of a sharer and an image forming device of a shared user, but are not limited thereto. The first and second forming devices may be used to distinguish different image forming devices. A service associated with the first image forming device may be referred to as a first service. A service associated with the second image forming device may be referred to as a second service. The first and second services may be used to distinguish different services. A user registration and device registration process for the shared user and their device is substantially the same as the example processes described in FIG. 1, and redundant explanation will be omitted.

A service shared by a sharer may be extended to an image forming device registered for a shared user. For example, a shared service may include a service to remotely control an image forming device to perform printing according to a request of a user. In that case, the shared user of the shared service may use the first image forming device of the sharer and the second image forming device of the shared user for remote printing.

The shared user (i.e., the second user) may also share a second service associated with the second image forming device with a sharer (i.e., the first user). In that case, a user interface device of the client device of the first user may display the first service information about the first service, and second service information about a second service shared by the second user. An example process of sharing a second service is substantially the same as the processes illustrated in FIGS. 3, 4, and 5, and a redundant explanation will be omitted.

A user of user registration information being associated with a service may use the service based on using the user registration information.

An owner of a service may stop sharing of the service. That is, the service may be disassociated from another user. Even after the sharing of the service is stopped, user registration information of a formerly-shared user may remain such that the formerly-shared user may be provided with a service by the server as an independent user. An owner who shared a service may request to delete their user registration information. Even after the user registration information of the owner who shared the service is deleted, the user registration information of a formerly-shared user who is now registered may remain in the server such that the registered formerly-shared user may communicate with the server 30 as an independent user to further register their device or directly subscribe to a service associated with his device.

FIGS. 4 and 5 illustrate examples in which an owner (i.e., a first user) of a service shares a service associated with an image forming device with another user (i.e., a second user), the second user may also share a service to which the second user subscribes with the first user. An example process in which the second user shares a service with the first user is substantially the same as the processes illustrated in FIGS. 4 and 5, and a redundant explanation will be omitted.

A first user or a second user may register a new image forming device, and the registration of the new image forming device may be performed as illustrated in FIG. 1. For example, the first user may share a first service associated with a first image forming device with a second user, and request a server to register a new image forming device. The new image forming device may be referred to as a third image forming device, but is not limited thereto. The first and third image forming devices may be used to distinguish different image forming devices. An example process of registering a third image forming device for the first user is substantially the same as the process illustrated in FIG. 1, and a redundant explanation will be omitted.

The first service associated with the first image forming device subscribed to by the first user may be extended to the newly-registered third image forming device. For example, based on the first service subscribed to by the first user being a service to remotely control an image forming device to perform printing according to a request of a user, the user may use the first image forming device and the third image forming device for remote printing.

Device identification information about the third image forming device may be transmitted to the server, and the server may associate the device identification information with the first service such that the first service associated with the first image forming device subscribed to by the first user is extended to the newly-registered third image forming device. For example, the server may register the device identification information to the service information about the first service, or register the device identification information to user registration information of the first user. The device identification information may be transmitted to the server while registering the third image forming device for the first user.

In a case where a service is shared between first and second users, the service may be automatically extended to a newly-registered image forming device. For example, after the first user shares the first service associated with the first image forming device with the second user, and the second user registers a new image forming device, the first service may be extended to the new image forming device registered for the second user. For example, based on the shared service being a service to remotely control an image forming device to perform printing according to a request of a user, the second user may use the first image forming device of the sharer (i.e., a first user) and the new image forming device registered for the second user.

Device identification information about the new image forming device may be transmitted to the server, and the server may associate the device identification information with the first service such that the first service associated with the first image forming device subscribed to by the first user is extended to the new image forming device registered for the second user. For example, the server may register the device identification information to the service information about the first service, or register the device identification information to user registration information of the second user. The device identification information may be transmitted to the server while registering the new image forming device for the second user.

In a case where first and second users share a service with each other and a new image forming device being registered for the first or second user is associated with another service, the other service associated with the new image forming device may be automatically shared among the first and second users. For example, the first user may share the first service associated with the first image forming device with the second user, request the server to register a new image forming device (i.e., a third image forming device), and a service different from the first service or a service having a different period or scope from the first service may be associated with the newly-registered image forming device. The service associated with the third image forming device may be referred to as a third service, but is not limited thereto. The first, second, and third services may be used to distinguish different services.

Device identification information about the newly-registered third image forming device may be transmitted to the server such that a third service associated with the newly-registered third image forming device is shared with the second user. The server may register the device identification information about the third image forming device to user registration information of the first user, generate third service information about the third service based on the device identification information, and register user registration information of the second user to tenant information of the generated third service information.

Therefore, various services may be shared between users, for example users who trust each other. Furthermore, in a case where the third service has a longer subscription period than the first service, the third service may continue to be shared among users even after the subscription period of the first service is expired.

Figure 6:
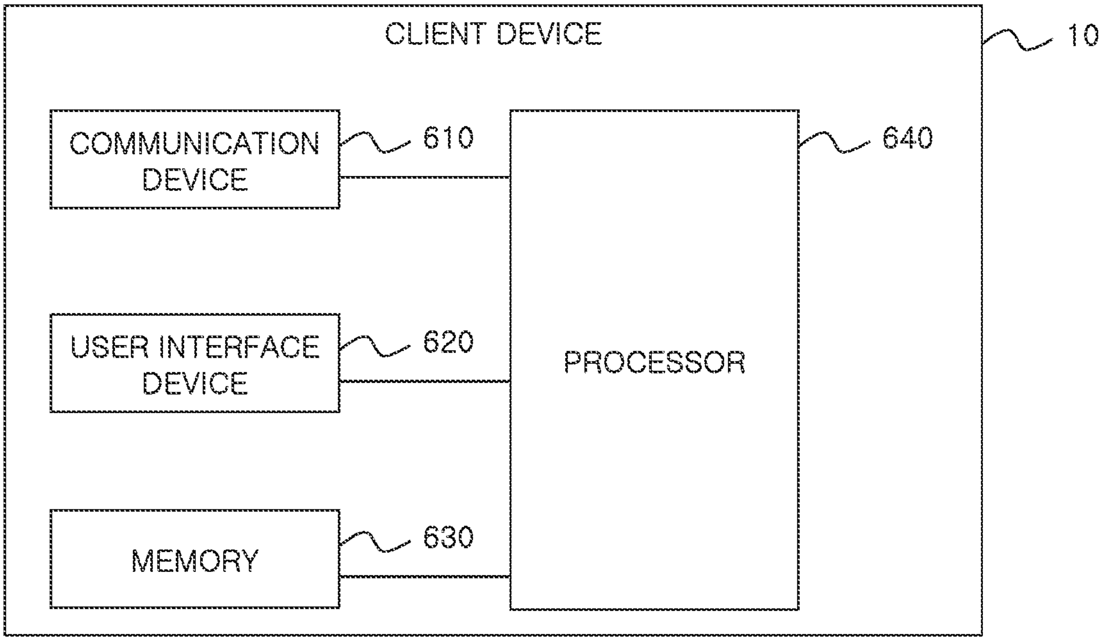
FIG. 6 is a block diagram of a client device according to an example.

FIG. 6 is a block diagram of a client device according to an example.

Referring to FIG. 6, the client device 10 may include a communication device 610, a user interface device 620, a memory 630 and a processor 640. However, the client device 10 may be realized by more or fewer components than the illustrated components.

The communication device 610 may communicate with an external apparatus. In an example, the communication device 610 may be connected to a network in a wired or wireless manner and communicate with the external apparatus. The external apparatus may be another client device 20 or a server 30, but is not limited thereto.

The communication device 610 may include a communication module (e.g., a transceiver) that supports one of various wired/wireless communication methods. For example, the communication module may be of a chipset type or may be a sticker/barcode (e.g., a sticker including a near field communication (NFC) tag) including information for communication. Also, the communication module may be a short range communication module or a wired communication module.

For example, the communication device 610 may support at least one of Wireless LAN, Wireless Fidelity (Wi-Fi), Wi-Fi Direct (WFD), Bluetooth, Bluetooth Low Energy (BLE), Wired Lan, NFC, Zigbee, infrared Data Association (IrDA), 3G, 4G, 5G, and the like.

The user interface device 620 may include an input unit to receive, from the user, an input of controlling the operation of the client device 10 and an output unit to display a result according to the operation of the client device 10 or information regarding a state of the client device 10. For example, the user interface device 620 may include a manipulation panel to receive a user input, a display panel to display a screen, etc.

In an example, the input unit may include a device to receive various types of user inputs, such as a keyboard, a physical button, a touchscreen, a camera, a microphone, and the like. Also, the output unit may include, for example, a display panel, a speaker, and the like, but is not limited thereto. For example, the user interface device 620 may include a device that supports various inputs and outputs.

The memory 630 may store machine readable instructions or a program. For example, the memory 630 may store instructions to display service information about a service associated with an image forming device, receive user identification information about another user to transmit the user identification information to the server, and the like.

The memory 630 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, an optical disc, and the like.

The processor 640 may control an operation of the client device 10 and may include at least one processor such as a Central Processing Unit (CPU). The processor 640 may include at least one processor peculiar to each function or one integrated processor.

The processor 640 may execute a program stored in the memory 630, read data or a file stored in the memory 630, or store new data or a file in the memory 630. The processor 640 may perform various example operations explained herein by executing a program or instructions stored in the memory 630, and a redundant explanation will be omitted.

Figure 7:
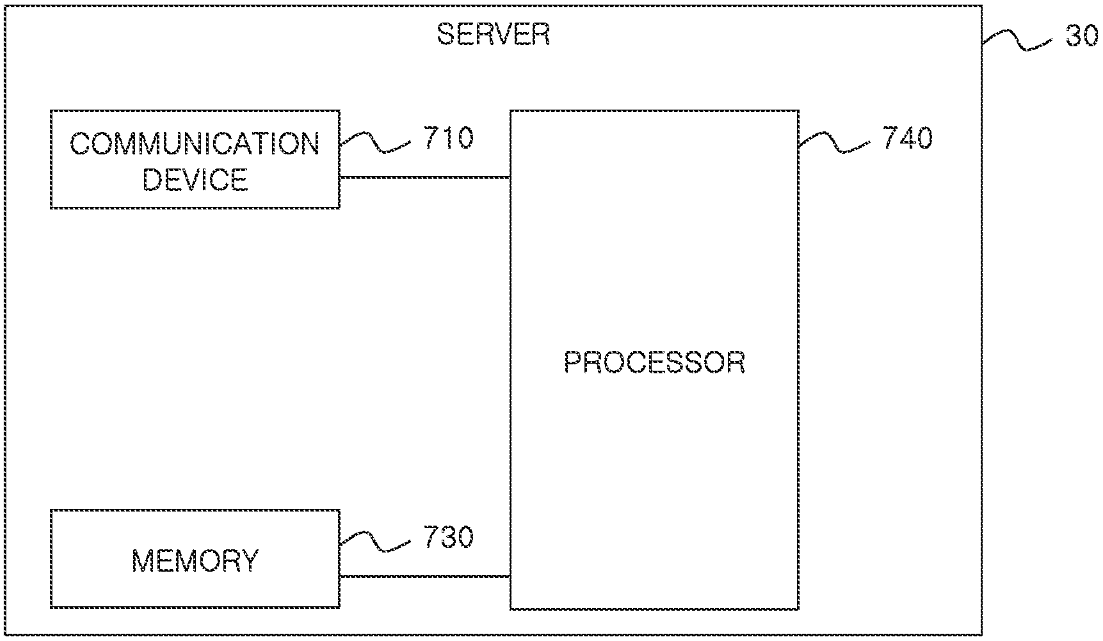
FIG. 7 is a block diagram of a server according to an example.

FIG. 7 is a block diagram of a server according to an example.

Referring to FIG. 7, the server 30 may include a communication device 710, a memory 730, and a processor 740. However, the server 30 may be realized by more or fewer components than the illustrated components.

The communication device 710 may communicate with an external apparatus. In an example, the communication device 710 may be connected to a network in a wired or wireless manner and communicate with the external apparatus. The external apparatus may be client device 10 or 20, but is not limited thereto.

The memory 730 may store machine readable instructions or a program. For example, the memory 730 may store instructions to perform user registration and device registration based on obtained user registration information of a user and device identification information of an image forming device, to provide the user with a service associated with the image forming device, to receive from the user identification information of another user to transmit a service invitation to the other user, and to provide the other user, who accepts the service invitation, with the service.

The processor 740 may execute a program stored in the memory 730, read data or a file stored in the memory 730, or store new data or a file in the memory 730. The processor 740 may perform various example operations explained herein by executing a program or instructions stored in the memory 730, and a redundant explanation will be omitted.

Figure 8:
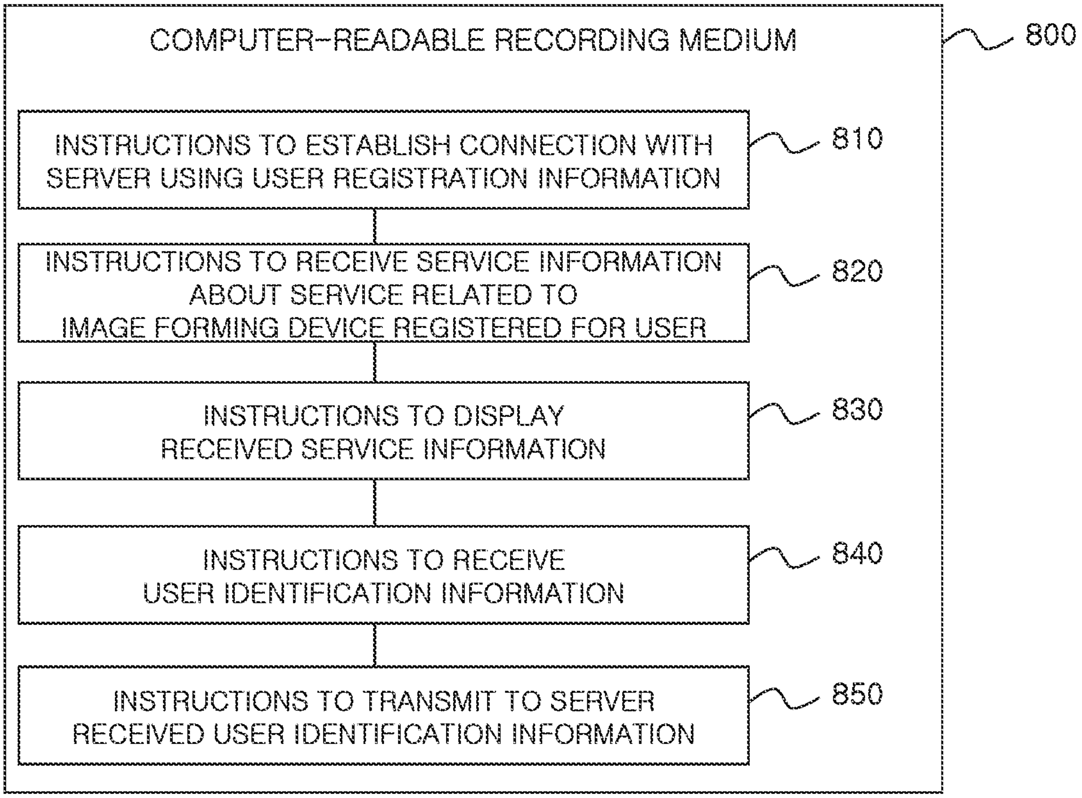
FIG. 8 is a diagram illustrating instructions stored in a non-transitory computer-readable storage medium according to an example.

FIG. 8 is a diagram illustrating instructions stored in a non-transitory computer-readable storage medium according to an example.

Referring to FIG. 8, a non-transitory computer-readable storage medium 800 may store instructions 810 to establish a connection with a server using user registration information, instructions 820 to receive service information about a service associated with the image forming device registered for the user, instructions 830 to display the first service information, instructions 840 to receive user identification information, and instructions 850 to transmit the received user identification information to the server, but is not limited thereto. The non-transitory computer-readable storage medium 800 may store more or fewer instructions than the instructions illustrated in FIG. 8.

Other functions of the instructions are substantially the same as those described above, and a redundant description is omitted.

Figure 9:
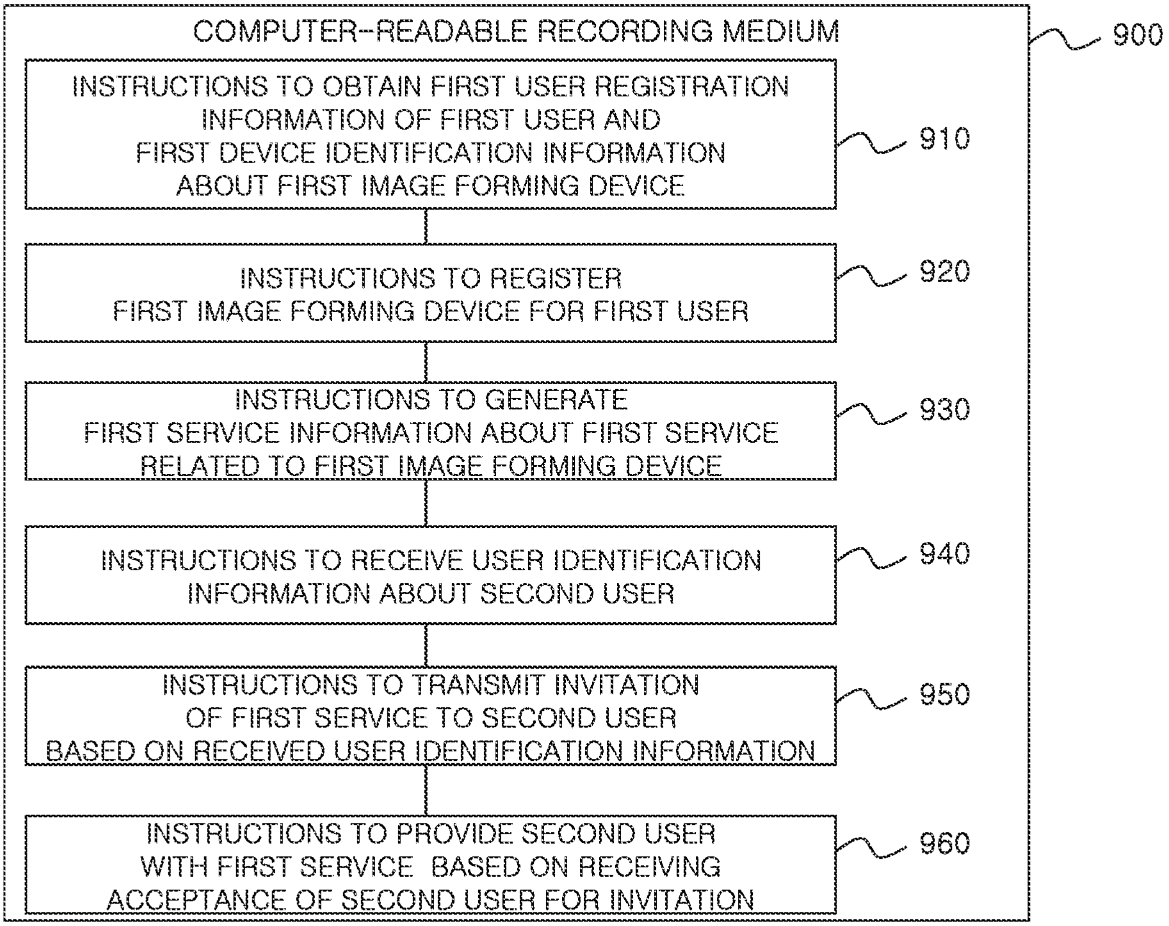
FIG. 9 is a diagram illustrating instructions stored in a non-transitory computer-readable storage medium according to an example.

FIG. 9 is a diagram illustrating instructions stored in a non-transitory computer-readable storage medium according to an example.

Referring to FIG. 9, a non-transitory computer-readable storage medium 900 may store instructions 910 to obtain first user registration information of a first user and first device identification information about a first image forming device, instructions 920 to register the first image forming device for the first user, instructions 930 to generate first service information about the first service associated with the first image forming device, instructions 940 to receive user identification information about a second user, instructions 950 to transmit to the second user an invitation to use the first service based on the user identification information, and instructions 960 to provide the second user with the first service in response to receiving an acceptance of the second user, but is not limited thereto. The non-transitory computer-readable storage medium 900 may include store more or fewer instructions than the instructions illustrated in FIG. 9.

Other functions of the instructions are substantially the same as those described above, and a redundant description is omitted.

Example operation methods of the client apparatus 10 or 20 or the server 30 may be realized as a non-transitory computer-readable storage medium storing therein a command or data executable by a computer or a processor. The above-described example operation method of the image forming device may be written in a program executable by a computer, and may be implemented in a general-purpose digital computer that operates such a program using a non-transitory computer-readable storage medium. Examples of such a non-transitory computer-readable storage medium may include read-only memory (ROM), random-access memory (RAM), flash memory, compact disc (CD)-ROMs, CD-recordables (Rs), CD+Rs, CD-rewritables (RWs), CD+RWs, and digital versatile disc (DVD)-ROMs, DVD-Rs, DVD+Rs, DVD-RWs, DVD+RWs, DVD-RAMs, blu-ray disc (BD)-ROMs, BD-Rs, BD-recordable low to highs (R LTHs), BD-REs, magnetic tapes, floppy disks, magneto-optical data storage devices, optical data storage devices, hard disks, solid-state disks (SSDs), and any device capable of storing machine readable instructions, associated data, data files, and data structures, and providing a processor or computer with machine readable instructions, associated data, data files, and data structures such that the processor or computer may execute the instructions.

While various examples are explained with reference to the accompanying drawings, various modifications and changes to the examples may be made. For example, the techniques described may be performed in a different order than the described methods, and/or the described systems, structures, devices, circuits, or any components may be integrated or combined in a different form than the described methods, or may be replaced or substituted by other components or their equivalents, in order to achieve an appropriate result.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A method performed at a client device, the method comprising: establishing a connection with a server to provide users with services being associated with image forming devices, by using first user registration information of a first user;

receiving from the server first service information about a first service associated with a first image forming device registered for the first user;

displaying the first service information through a user interface device of the client device to receive user identification information about a second user through the user interface device; and transmitting to the server the received user identification information about the second user such that the server provides the second user with the first service associated with the first image forming device, wherein the server, in response to a failure of retrieving second user registration information of the second user based on the user identification information, generates the second user registration information based on the user identification information and associates the first service with the second user registration information.

2. The method of claim 1, wherein the user identification information about the second user comprises recipient information of the second user.

3. The method of claim 1, wherein the first service comprises causing the first image forming device to print data received from the server.

4. The method of claim 1, wherein the first service provided by the server is extended to a second image forming device registered for the second user in the server.

5. The method of claim 1, further comprising:

transmitting to the server device identification information about a third image forming device such that the server provides the first user and the second user with a third service associated with the third image forming device.

6. The method of claim 1, further comprising:

transmitting to the server device identification information about a third image forming device to extend the first service provided by the server to the third image forming device.

7. The method of claim 1, further comprising:

displaying, based on accepting an invitation of a second service associated with a second image forming device of the second user, second service information about the second service provided by the server on the user interface device of the client device.

8. The method of claim 7, wherein the second service provided by the server is extended to the first image forming device.

9. A method performed at a server, comprising:

obtaining, from a first user, first user registration information of the first user and first device identification information about a first image forming device;

registering the first image forming device for the first user based on the first user registration information and the first device identification information;

generating first service information about a first service associated with the first image forming device to provide the first user with the first service;

receiving, from the first user, user identification information about a second user;

transmitting to the second user an invitation for use of the first service based on the user identification information; and based on acceptance of the invitation from the second user, configuring the first service to allow the second user to access the first service;

retrieving second user registration information of the second user based on the user identification information about the second user;

in response to a failure of retrieving the second user registration information based on the user identification information, generating the second user registration information based on the user identification information; and associating the first service with the second user registration information of the second user.

10. The method of claim 9, further comprising:

disassociating the first service from the second user registration information of the second user based on receiving, from the first user, a request for suspension of providing the second user with the first service.

11. The method of claim 9, further comprising:

in response to receiving from the first user a request for deleting the first user registration information of the first user, disassociating the first service from the second user registration information of the second user and deleting the first user registration information.

12. The method of claim 9, further comprising:

in response to receiving from the second user a request for registering a second image forming device of the second user, registering the second image forming device for the second user based on the second user registration information of the second user and the second device identification information of the second image forming device.

13. The method of claim 9, further comprising:

receiving, from the first user and the second user, data and forwarding the data to the first image forming device to provide the first user and the second user with the first service.

14. A non-transitory computer-readable storage medium that stores instructions executable by a processor, the non-transitory computer-readable storage medium comprising:

instructions to establish connection with a server to provide users with services being associated with image forming devices, by using first user registration information of a first user, instructions to receive from the server first service information about a first service associated with a first image forming device registered for the first user;

instructions to display the first service information through a user interface device of the client device to receive user identification information about a second user through the user interface device; and instructions to transmit to the server the received user identification information about the second user such that the server provides the second user with the first service associated with the first image forming device, wherein the server, in response to a failure of retrieving second user registration information of the second user based on the user identification information, generates the second user registration information based on the user identification information and associates the first service with the second user registration information.

* * * * *